United States Patent
Xu et al.

(10) Patent No.: US 8,649,344 B2
(45) Date of Patent: Feb. 11, 2014

(54) METHOD OF COORDINATING PRECODING MATRIXES IN A WIRELESS COMMUNICATION SYSTEM

(75) Inventors: Jian Xu, Anyang-si (KR); Ja Ho Koo, Anyang-si (KR); Bin Chul Ihm, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 13/142,545

(22) PCT Filed: Nov. 24, 2009

(86) PCT No.: PCT/KR2009/006913
§ 371 (c)(1),
(2), (4) Date: Jun. 28, 2011

(87) PCT Pub. No.: WO2010/120024
PCT Pub. Date: Oct. 21, 2010

(65) Prior Publication Data
US 2011/0268068 A1    Nov. 3, 2011

Related U.S. Application Data

(60) Provisional application No. 61/169,317, filed on Apr. 15, 2009, provisional application No. 61/172,231, filed on Apr. 24, 2009.

(51) Int. Cl.
*H04W 4/00* (2009.01)

(52) U.S. Cl.
USPC ............................ 370/329; 370/252; 370/334

(58) Field of Classification Search
USPC .......................................... 370/252, 329, 334
See application file for complete search history.

(56) References Cited

U.S. PATENT DOCUMENTS

| | | | | |
|---|---|---|---|---|
| 8,369,429 | B2 * | 2/2013 | Koo et al. | 375/260 |
| 8,396,006 | B2 * | 3/2013 | van Rensburg | 370/252 |
| 2003/0185310 | A1 | 10/2003 | Ketchum et al. | |
| 2007/0274411 | A1 | 11/2007 | Lee et al. | |
| 2009/0092059 | A1 * | 4/2009 | Fu | 370/252 |
| 2009/0181708 | A1 * | 7/2009 | Kim et al. | 455/501 |
| 2009/0286562 | A1 * | 11/2009 | Gorokhov | 455/501 |
| 2010/0208610 | A1 * | 8/2010 | Ihm et al. | 370/252 |
| 2011/0034192 | A1 * | 2/2011 | Lim et al. | 455/501 |

FOREIGN PATENT DOCUMENTS

| | | |
|---|---|---|
| EP | 1 699 145 | 9/2006 |
| KR | 2004-0089748 | 10/2004 |
| KR | 2006-0096360 | 9/2006 |
| KR | 2007-0114099 | 11/2007 |

OTHER PUBLICATIONS

International Search Report from PCT/KR2009/003913 (PCT corresponding to present application).
Bauch, "MIMO Technologies for the Wireless Future", IEEE 19th International Symposium on Personal, Indoor and Mobile Radio Communications, Sep. 2008.

\* cited by examiner

*Primary Examiner* — Jason Mattis
(74) *Attorney, Agent, or Firm* — Morgan, Lewis & Bockius LLP (57) ABSTRACT

A method of coordinating precoding matrixes in a wireless communication system is disclosed. A method of coordinating precoding matrixes by a base station in a wireless communication system comprises receiving precoding matrix index information from neighbor cells; and generating PMI allocation for each resource according to the precoding matrix index information wherein at least one PMI is restricted or recommended in part of resource in the PMI allocation for each resource.

6 Claims, 6 Drawing Sheets

▨ eNB2 restricts/ recommends PMI 1 for UEedge_A
of Cell B decided by its scheduler ▨ eNB2 restricts/ recommends PMI 3 for UEedge_B
of Cell A decided by its scheduler ☐ eNB2 does not restrict/ recommend any PMI decided by its scheduler,
so its inner cell users can pick up any PMI as desired

METHOD OF COORDINATING PRECODING MATRIXES IN A WIRELESS COMMUNICATION SYSTEM

The present application is a national stage of PCT International Application No. PCT/KR2009/006913 filed Nov. 24, 2009, and claims the benefit of U.S. Provisional Application Nos. 61/169,317, filed Apr. 15, 2009, and 61/172,231, filed Apr. 24, 2009.

TECHNICAL FIELD

The present invention relates to a wireless communication system, and more particularly to a method of coordinating precoding matrixes in a wireless communication system.

BACKGROUND ART

Multi-Input Multi-Output (MIMO) technology improves efficiency of data transmission and receipt using a multiple transmission antenna and a multiple receipt antenna.

While a receiver receives data through a single path if a single antenna is used, a receiver receives data through multiple paths if a multiple antenna is used. Thus, speed and capacity of data transmission is improved and coverage is enlarged.

Generally, there are an open-loop MINO system in which a transmitter doesn't use feedback information from a receiver and a closed-loop MINO system in which a transmitter uses feedback information from a receiver in multiple antenna systems. In a closed-loop multiple antenna system, a receiver transmits feedback information about channel status to a transmitter and the transmitter detects channel status through it so that performance of a communication system is improved. It is well known that a closed-loop MIMO system may enhance the average user-throughput and cell-edge throughput in the multi-cell environments.

A transmitter multiplies data by precoding matrix and transmits the data. Thus, transmission signal (y) which is transmitted through a multiple antenna by a transmitter is represented as Equation 1.

$$y = Wz \qquad \text{[Equation 1]}$$

Herein, W is an element of a predetermined codebook, and z is a signal outputted from a MIMO encoder.

In a closed-loop multiple antenna system, a receiver selects a precoding matrix from a predetermined codebook and transmits an index of the selected precoding matrix to a transmitter. Then, the transmitter multiplies data by the selected precoding matrix and transmits the data. In a open-loop multiple antenna system, a receiver does not transmit a feedback for a precoding matrix, and a transmitter precodes data using precoding matrixes of a predetermined codebook rotationally.

However, cell-edge area UEs are vulnerable to the inter-cell interference from adjacent cells. In particular, the usage of certain subset of codebook can give a bad influence on the neighboring cell-edge users, which results in the basic PMI (precoding matrix index) restriction/recommendation scheme.

According to the basic PMI restriction/recommendation scheme, some PMIs are restricted or recommended in the whole frames or frequency band. Thus, the throughput of inner-cell UEs is reduced a lot.

DISCLOSURE OF INVENTION

Technical Problem

As previously stated above, the related art has a problem that the throughput of inner-cell UEs is reduced a lot.

An object of the present invention is to provide a method of coordinating precoding matrixes, which can improve performance of a wireless communication system.

Technical subject matters to be realized by embodiments of the present invention are not limited to the above-mentioned technical subject matters, and other technical subject matters not mentioned in the above-mentioned description may be easily appreciated by those skilled in the art to which the present invention pertains without difficulty.

Technical Solution

In order to solve the above technical problems, a method of coordinating precoding matrixes by a base station in a wireless communication system comprises receiving precoding matrix index information from neighbor cells; and generating PMI allocation for each resource according to the precoding matrix index information wherein at least one PMI is restricted or recommended in part of resource in the PMI allocation for each resource.

In this case, the precoding matrix index information is information of indexes of precoding matrixes which the neighbor cells request the base station to use or/and not to use.

Also, the method further comprises transmitting information of the PMI allocation for each resource to the neighbor cells.

Also, the part of resource is only used for user equipments in cell edge.

Also, the precoding matrix index information is information of indexes of precoding matrixes which the neighbor cells request the base station to use or/and not to use in at least one subframe.

Also, the at least one subframe is decided by user equipments of the neighbor cells.

Also, the at least one subframe is decided by a base station of the neighbor cells.

Also, the method further comprises transmitting feedback such as yes or no to the neighbor cells.

Also, part of resource is part of subframes which is used by the base station.

Also, the PMI allocation for each resource is generated considering to resource situation of the base station.

Advantageous Effects

According to the embodiments of the present invention, since PMIs restricted in only partial resource, performance of a whole wireless communication system is improved.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. For convenience of description and better understanding of the present invention, some parts unrelated to the inventive concept of the present invention will be omitted herein. Wherever possible, the same reference numbers will be used throughout the drawings to refer to the same or like parts.

In the whole part of the specification of the present invention, if it is assumed that a certain part includes a certain component, the term 'including' means that a corresponding component may further include other components unless a specific meaning opposed to the corresponding component is written. In addition, another term ' . . . part', " . . . unit', 'module' or the like means a unit for processing at least one function or operation, and this unit may be implemented by hardware, software, or a combination thereof.

First, basic precoding matrix index (PMI) restriction/recommendation scheme will be described with reference to FIG. 1.

PMI restriction/recommendation scheme is one of the main concepts of CoMP in which multiple eNBs (or relay station, femto cell eNB) collaborate to mitigate inter-cell interference (ICI). PMI restriction/recommendation scheme can be supported by UE reporting such as bad PMI set reporting which is a form of collaboration among multiple eNBs to mitigate ICI by restricting strongly interfering PMI or recommending to use the least interfering PMI.

Figure 1:
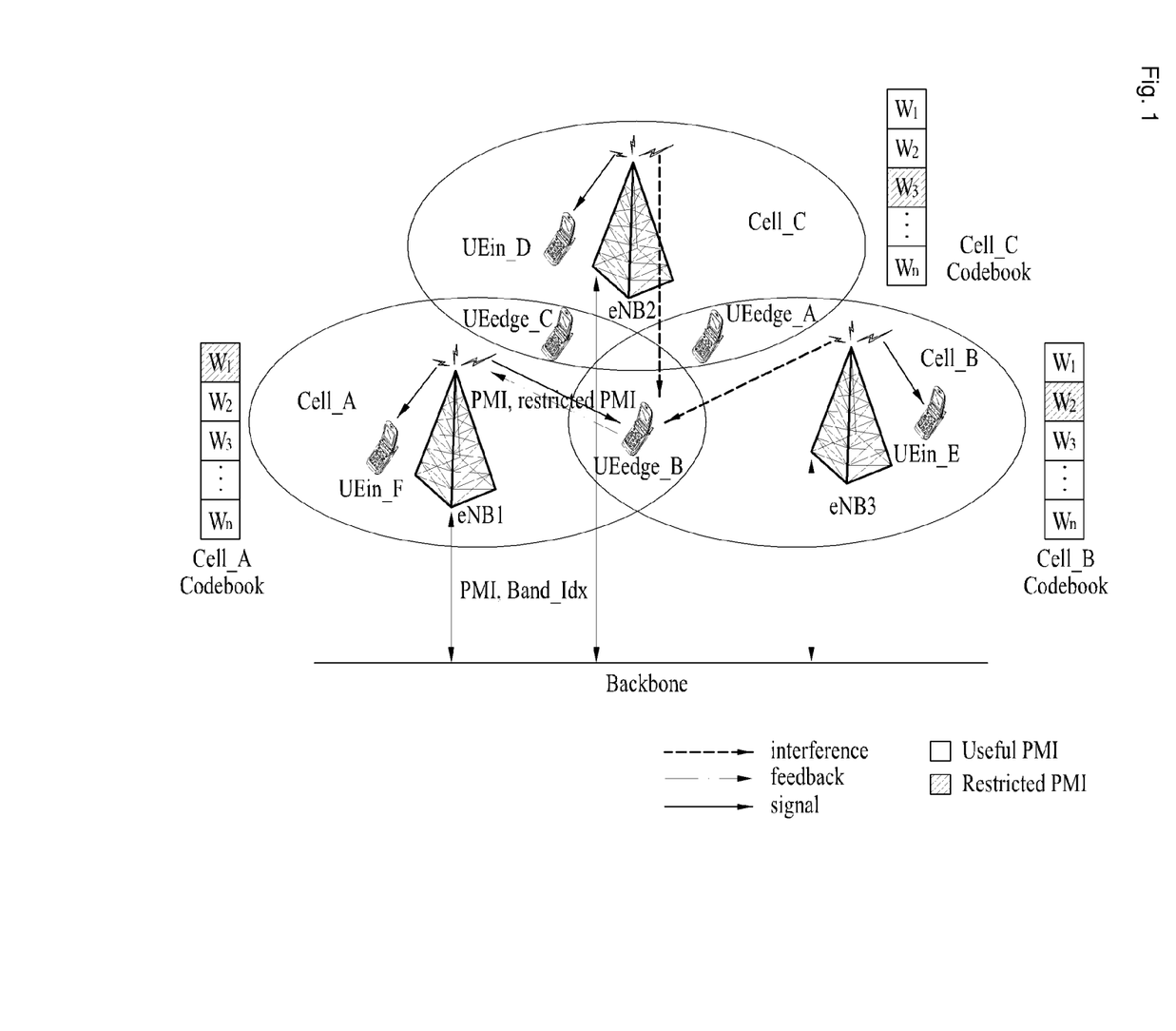
FIG. 1 illustrates an example of the operation principle of basic PMI restriction/recommendation scheme.

FIG. 1 illustrates an example of the operation principle of basic PMI restriction/recommendation scheme.

In FIG. 1, all base stations (eNBs) are connected via the backbone network and it is assumed that all eNBs use the same codebook for pre-coding.

UEedge_B is a user equipment located at the cell_A boundary and affected by the neighboring cells (cell_B and cell_C). The other user equipments (UEs) (UEin_D, UEin_E and UEin_F) are located at the inner side of each cell so that they receive a high transmission power signal.

According to the basic PMI restriction/recommendation scheme, the UEedge_B searches first precoding matrixes indexes (PMIs) which the UEedge_B request interfering cells to use or second precoding matrixes indexes which the UEedge_B request interfering cells not to use from the reference signals of the interfering eNBs (eNB_2, eNB_3). And the UEedge_B transmits the first PMIs or second PMIs to the serving eNB (eNB_1).

And the serving eNB (eNB_1) transfers the PMI restriction/recommendation information to the corresponding interfering eNBs (eNB_2, eNB_3) through the backbone network. If the eNB_2 located in Cell_C receives the PMI restriction/recommendation information from the serving eNB (eNB_1), it does not allocate the restricted PMI or allocate the recommended PMI to the inner UEs.

Accordingly, inner UEs served by the interfering eNBs can use only the reduced codebook set due to the PMI restriction/recommendation. On the contrary, cell edge users can use the full codebook without any restrictions of PMI in order to maximize beamforming gain. Thus the cell edge UEs get benefits from the PMI restriction/recommendation because of the mitigated ICI by sacrificing the inner UEs' throughput.

Next, a method of coordinating precoding matrixes according to first embodiment of the present invention will be described with reference to FIGS. 2 to 4.

According to first embodiment of the present invention, interfering cells does not allocate the restricted PMI or allocate the recommended PMI to the inner UEs in only part of subframes, subbands or radio frames, which aims to improve the inner-cell UEs throughput.

And, the inner UEs are not necessary to know the PMI restriction/recommendation information, which may reduce the signaling overhead compared with the basic PMI restriction/recommendation scheme.

Figure 2:
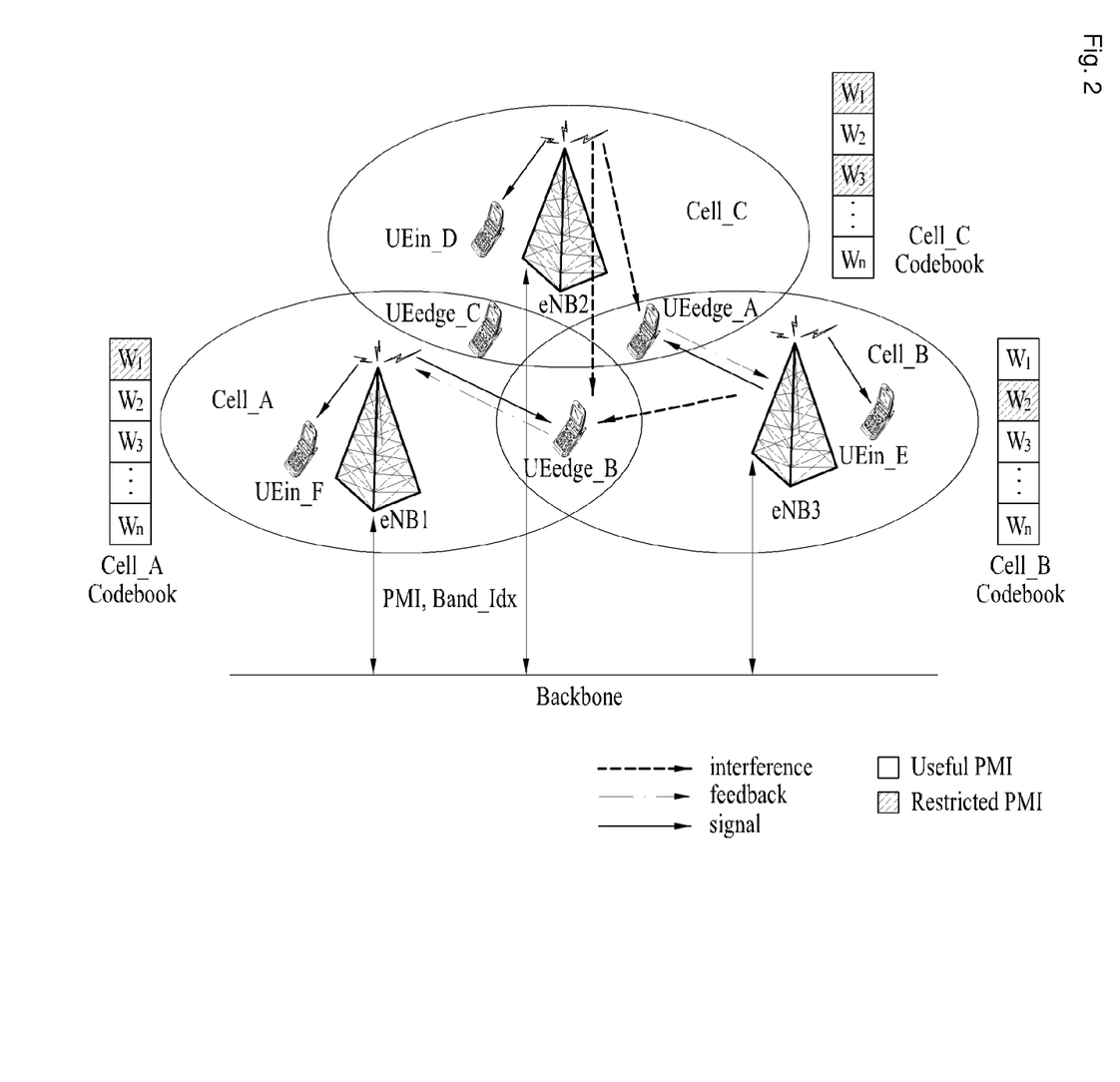
FIG. 2 illustrates an example of a method of coordinating precoding matrixes according to embodiments of the present invention.

FIG. 2 illustrates an example of a method of coordinating precoding matrixes according to embodiments of the present invention. And, FIG. 3 is a flowchart of a method of coordinating precoding matrixes according to first embodiment of the present invention.

In FIG. 2, the multi-cell structure is shown where each of the three cells is the serving cell while at the same time it is also the interfering cell from other cell point of view. In this example, it is firstly assumed that Cell_A and Cell_B take the role of serving cells which provide the signals to UEedge_B and UEedge_A respectively, and Cell_C is serving cell of UEin_D while Cell_C is the interfering cell of UEedge_B and UEedge_A.

Figure 3:
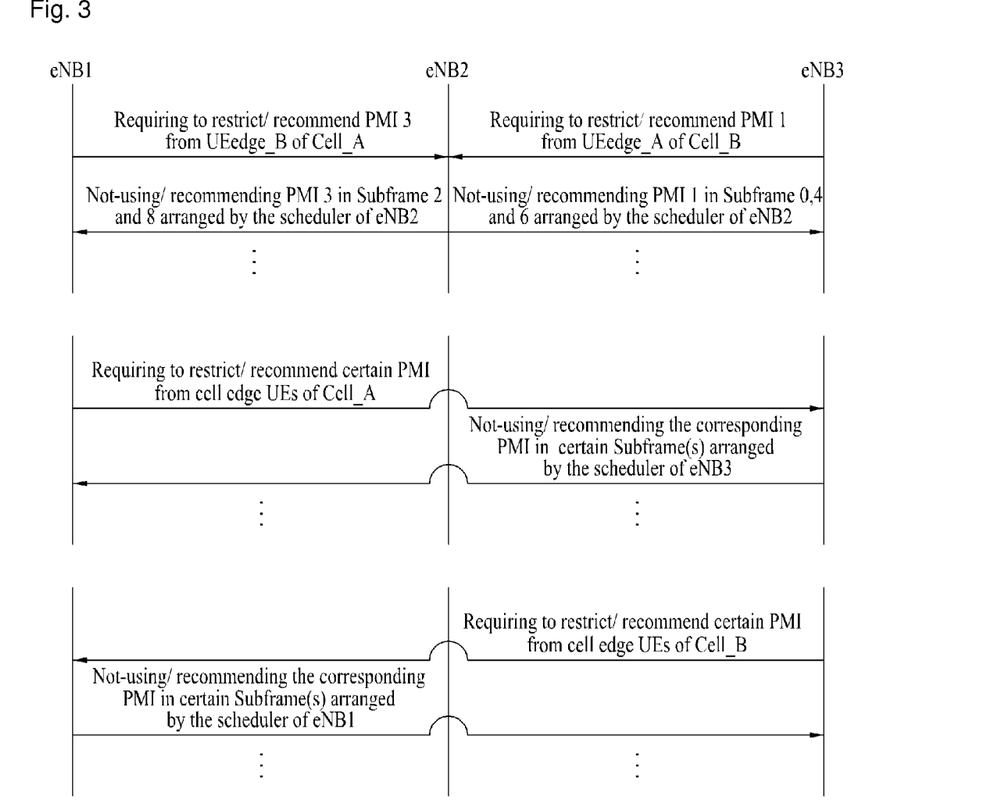
FIG. 3 is a flowchart of a method of coordinating precoding matrixes according to first embodiment of the present invention.

As illustrated in FIG. 3, eNB2 receives precoding matrix index information from neighbor cells (Cell_A, Cell_B). The precoding matrix index information is information of indexes of precoding matrixes which the neighbor cells request the eNB2 to use or/and not to use.

For example, if UEedge_B receives interference from PMI 3 of eNB2, UEedge_B requests eNB1 to restrict eNB2 to use PMI 3. And, if UEedge_A receives interference from PMI 1 of eNB2, UEedge_A requests eNB3 to restrict eNB2 to use PMI 1. Then, eNB1 requests eNB2 not to use PMI 3 and eNB3 requests eNB2 not to use PMI 1.

And, eNB2 generates PMI allocation for each resource according to the received precoding matrix index information. And eNB2 can also consider resource situation of eNB2 when generating PMI allocation for each resource. Resource can be subframe, subband or subframe and subband. Accoding to first embodiments of the present invention, PMI, which is requested to be restricted by neighbor cell, is restricted in part of resource. And, PMI, which is requested to be recommended by neighbor cell, is recommended in part of resource. The part of resource may be only used for the cell edge UEs.

Figure 4:
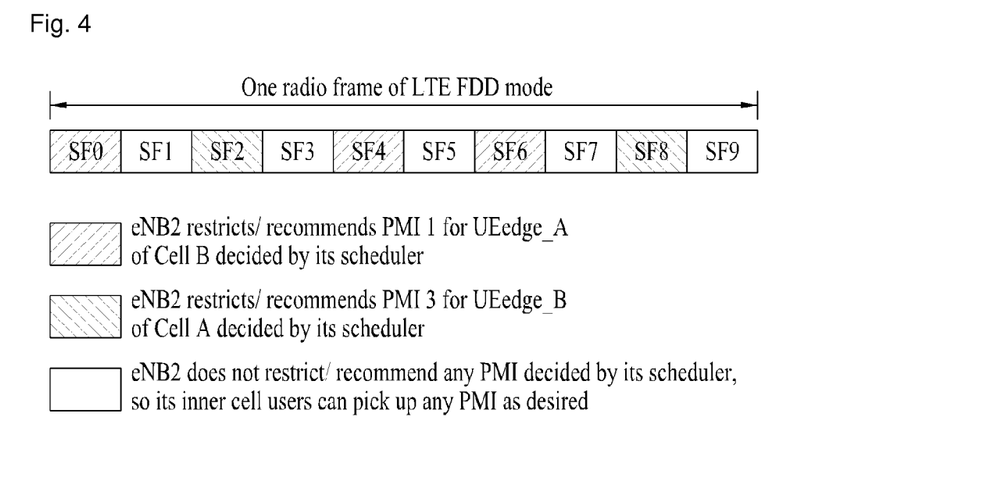
FIG. 4 illustrated an example of PMI allocation for each subframe.

FIG. 4 illustrated an example of PMI allocation for each subframe. In FIG. 4, PMI 3 is restricted in subframe 2 and 8 and, PMI 1 is restricted in subframe 0, 4 and 6.

And, eNB2 transmits information of the PMI allocation for each resource to the neighbor cells. In FIG. 3, eNB2 inform eNB1 that PMI 3 is not used in subframe 2 and 8. And eNB2 inform eNB3 that PMI 1 is not used in subframe 0, 4 and 6.

Since there is no PMI restriction/recommendation in some subframes, thus the inner cell user equipments of Cell_C can pick up any PMI there as desired. In this way, the inner cell UEs will not lose a lot of throughput while the cell-edge UEs' throughput can also be improved.

From the description above it is easy to see that the inner cell UEs do not need to know the PMI restriction/recommendation information. They just follow the arrangement of scheduler.

Next, a method of coordinating precoding matrixes according to second and third embodiments of the present invention will be described with reference to FIGS. 2 and 5 to 7.

PMI restriction/recommendation scheme via the eNB's scheduling of the corresponding interfering cell or the serving cell and interfering cell together is proposed in second and third embodiments of the present invention. PMI restriction/recommendation is based on the resource requirement of cell-edge UEs.

According to second and third embodiments of the present invention, the inner cell UEs are not necessary to know the PMI restriction/recommendation information (the modified codebook information) which may reduce the signaling overhead compared with the basic PMI restriction/recommendation scheme and, the scheduler of interfering cells (or the serving cell and interfering cell together) restrict/recommend PMIs in only part of subframes, subbands or radio frames according to the cell-edge UEs' requirement of certain PMIs restriction/recommendation in the preferred resources such as subbands. And the scheduling information sent from interfering cell to neighbor cells will be reduced a lot.

According to second embodiment of the present invention, serving eNBs of UEs, which receive interference, just deliver the requirement of UEs to interfering cell without scheduling.

And, according to third embodiment of the present invention, serving eNBs of UEs, which receive interference, arrange the resource requirement from all of the UEs and then make a feedback decision and transmit it to interfering cell.

A method of coordinating precoding matrixes according to second embodiment of the present invention in situation of FIG. 2 will be described.

Figure 5:
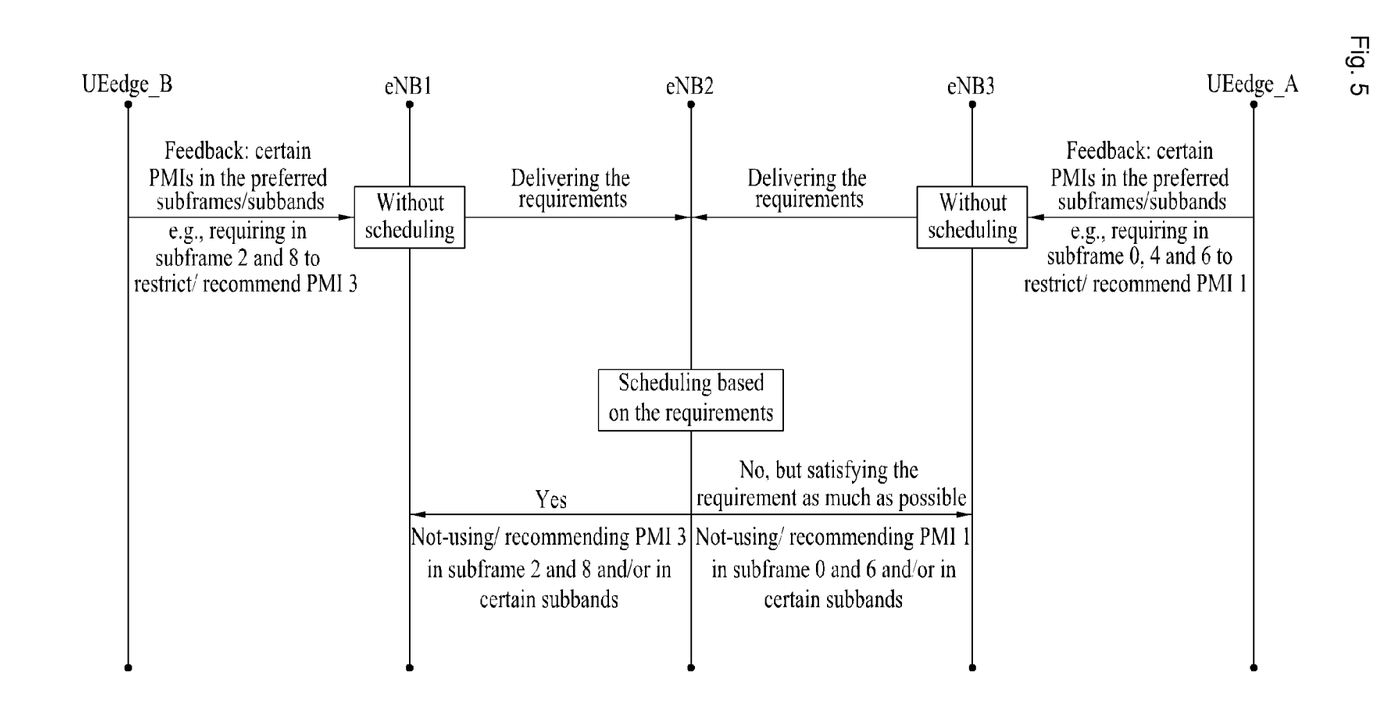
FIG. 5 is a flowchart of a method of coordinating precoding matrixes according to second embodiment of the present invention.

FIG. 5 is a flowchart of a method of coordinating precoding matrixes according to second embodiment of the present invention.

In FIG. 2, Cell_A and Cell_B take the role of serving cells which provide the signals to UEedge_B and UEedge_A respectively, and Cell_C is serving cell of UEin_D while Cell_C is the interfering cell of UEedge_B and UEedge_A.

As illustrated in FIG. 5, UEs, which receive interference from neighbor cell, request a serving eNB to restrict the neighbor cell not to use interfering PMI in the preferred resource. Resource can be subframe, subband or subframe and subband. Or, UEs request a serving eNB to recommend the neighbor cell to use specific PMIs in the preferred resource. For example, UEedge_B requests eNB1 to restrict eNB2 to use PMI 3 in subframe 2 and 8. And, UEedge_A requires eNB3 to restrict eNB2 to use PMI 1 in subframe 0, 4 and 6.

Then, a serving eNB collects requests of UEs and just deliver them to an interfering cell without scheduling. In FIG. 5, eNB1 delivers request of UEedge_B to eNB2, and eNB3 delivers request of UEedge_A to eNB2.

Thus, eNB2 receives information of precoding matrix index requested to restrict or recommend from neighbor cells (Cell_A, Cell_B). The precoding matrix index information is information of indexes of precoding matrixes which the neighbor cells request the eNB2 to use or/and not to use in preferred resource.

Figure 6:
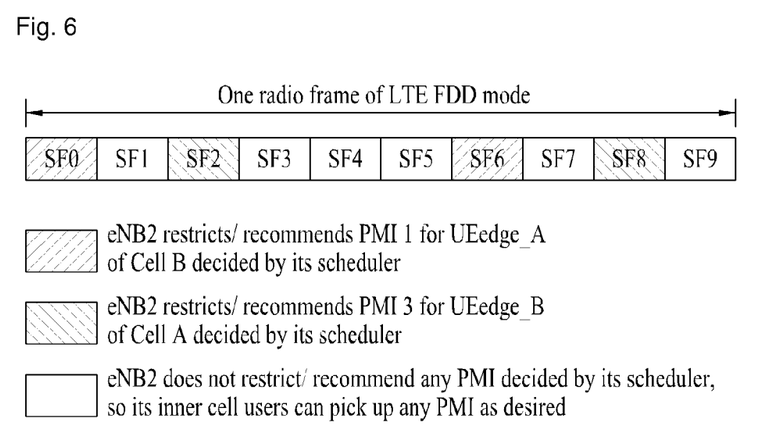
FIG. 6 illustrated an example of PMI allocation for each subframe according to second embodiment of the present invention.

And, eNB2 generates PMI allocation for each resource according to the received precoding matrix index information. And eNB2 can also consider resource situation of eNB2 when generating PMI allocation for each resource. Resource can be subframe, subband or subframe and subband. According to second embodiment of the present invention, PMI, which is requested to be restricted by neighbor cell, is restricted in part of resource. And, PMI, which is requested to be recommended by neighbor cell, is recommended in part of resource. When generating PMI allocation for each resource, eNB2 will try to satisfy the requirement of neighbor cells as much as possible FIG. 6 illustrated an example of PMI allocation for each subframe according to second embodiment of the present invention. In FIG. 6, PMI 3 is restricted in subframe 2 and 8 and, PMI 1 is restricted in subframe 0 and 6. In FIG. 6, the requirement of UEedge_B is satisfied while the requirement of UEedge_A is partially satisfied.

And eNB2 transmits feedback such yes or no to neighbor cells. If the requirement of neighbor cell is satisfied, eNB2 transmits yes to neighbor cell. And, if the requirement of neighbor cell is not satisfied, eNB2 transmits no to neighbor cell. In FIG. 6, the requirement of UEedge_B is satisfied while the UEedge_A is partially satisfied. Thus, In FIG. 5, eNB2 transmits yes and no to eNB1 and eNB3 respectively.

Since there is no PMI restriction/recommendation in some subframes, thus the inner cell user equipments of Cell_C can pick up any PMI there as desired. In this way, the inner cell UEs will not lose a lot of throughput while the cell-edge UEs' throughput can also be improved.

A method of coordinating precoding matrixes according to third embodiment of the present invention in situation of FIG. 2 will be described.

Figure 7:
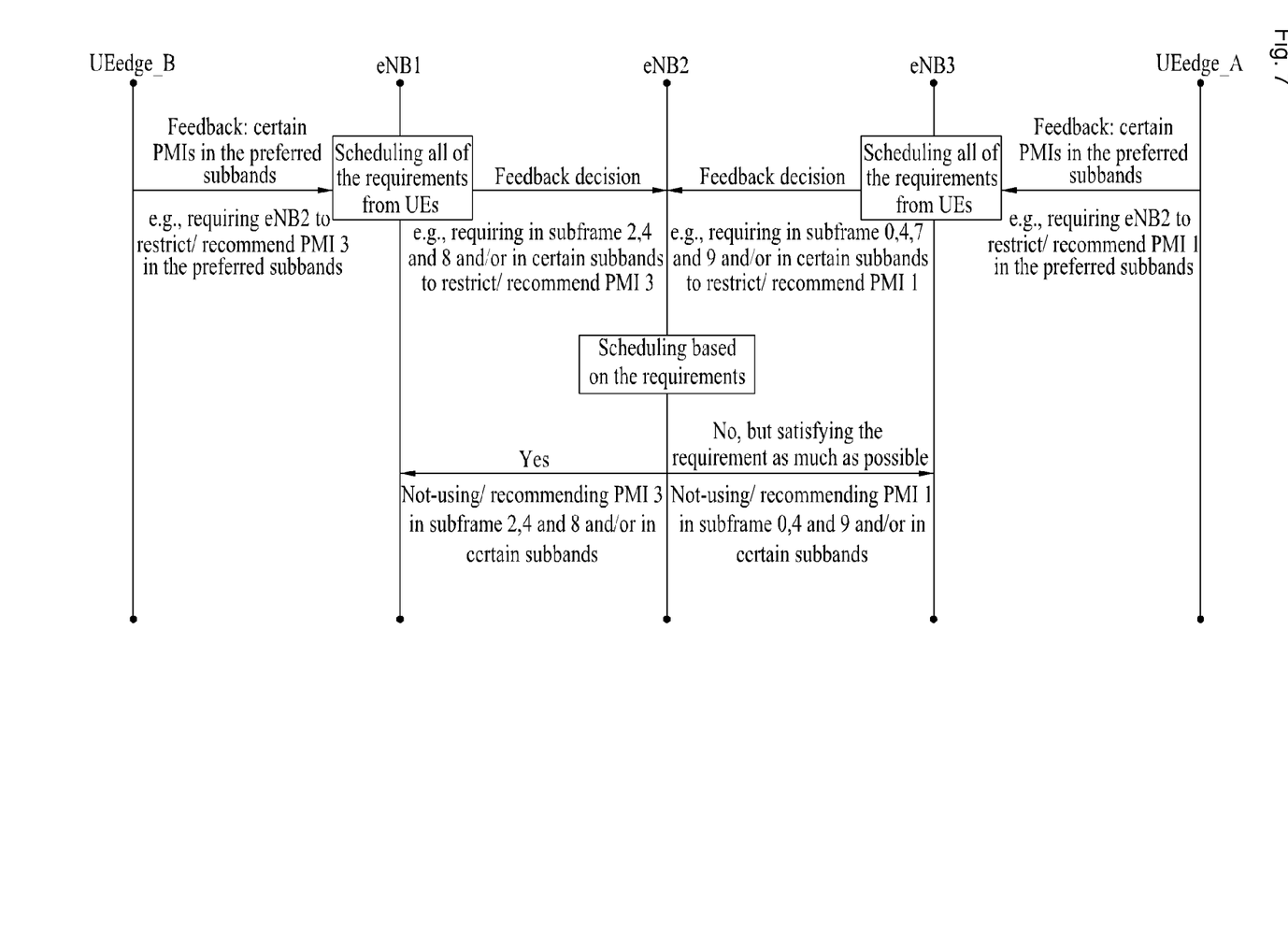
FIG. 7 is a flowchart of a method of coordinating precoding matrixes according to third embodiment of the present invention.

FIG. 7 is a flowchart of a method of coordinating precoding matrixes according to third embodiment of the present invention.

In FIG. 2, Cell_A and Cell_B take the role of serving cells which provide the signals to UEedge_B and UEedge_A respectively, and Cell_C is serving cell of UEin_D while Cell_C is the interfering cell of UEedge_B and UEedge_A.

As illustrated in FIG. 7, UEs, which receive interference from neighbor cell, request a serving eNB to restrict the neighbor cell not to use interfering PMI in the preferred resource. Resource can be subframe, subband or subframe and subband. Or, UEs request a serving eNB to recommend the neighbor cell to use specific PMIs in the preferred resource. For example, UEedge_B requests eNB1 to restrict eNB2 to use PMI 3 in preferred subframes. And, UEedge_A requires eNB3 to restrict eNB2 to use PMI 1 in preferred subframes.

Then, a serving eNB arranges the requirements of UEs and make a decision to restrict or recommend PMIs in specific resource. And a serving eNB transmits the decision to interfering cell. For example, eNB1 makes a decision to restrict PMI 3 in subframe 2, 4 and 8 and transmits the decision to eNB2 and eNB3 makes a decision to restrict PMI 1 in subframe 0, 4, 7 and 9 and transmits the decision to eNB2.

Thus, eNB2 receives information of precoding matrix index requested to restrict or recommend from neighbor cells (Cell_A, Cell_B). The precoding matrix index information is information of indexes of precoding matrixes which the neighbor cells request the eNB2 to use or/and not to use in preferred resource.

And, eNB2 generates PMI allocation for each resource according to the received precoding matrix index information. And eNB2 can also consider resource situation of eNB2 when generating PMI allocation for each resource. Resource can be subframe, subband or subframe and subband. Accoding to third embodiment of the present invention, PMI, which is request to be restricted by neighbor cell, is restricted in part of resource. And, PMI, which is request to be recommended by neighbor cell, is recommended in part of resource. When generating PMI allocation for each resource, eNB2 will try to satisfy the requirement of neighbor cells as much as possible.

And eNB2 transmits feedback such as yes or no to neighbor cells. If the requirement of neighbor cell is satisfied, eNB2 transmits yes to neighbor cell. And, if the requirement of neighbor cell is not satisfied, eNB2 transmits no to neighbor cell. In FIG. 7, eNB2 transmits yes and no to eNB1 and eNB3 respectively.

The invention claimed is:

1. A method of coordinating precoding matrixes by a first base station in a cell in a wireless communication system, the method comprising:
    receiving precoding matrix index (PMI) restriction/recommendation information from a user equipment (UE) in the cell, wherein the PMI restriction/recommendation information indicates that at least one PMI is not used or is used by a second base station in a neighbor cell;
    generating PMI scheduling information based on the PMI restriction/recommendation information, wherein the PMI scheduling information indicates at least one time resource where the at least one PMI is not used or is used by the second base station in the neighbor cell;
    transmitting the PMI restriction/recommendation information and the PMI scheduling information to the second base station in the neighbor cell; and
    receiving feedback information from the second base station,
    wherein the feedback information indicates whether or not the second base station will use the PMI restriction/recommendation information and the PMI scheduling information in the neighbor cell.

2. The method according to claim 1, wherein the UE is located in a cell edge of the cell.

3. The method according to claim 1, wherein the at least one time resource comprises at least one subframe.

4. The method according to claim 1, wherein the PMI restriction/recommendation information and the PMI scheduling information are not applied to a UE in an inner cell area of the neighbor cell.

5. The method according to claim 1, wherein the PMI scheduling information further indicates at least one frequency resource where the at least one PMI is not used or is used by the second base station in the neighbor cell.

6. The method according to claim 5, wherein the at least one frequency resource comprises at least one subband.

* * * * *